United States Patent [19]

Bosco et al.

[11] Patent Number: 4,899,845
[45] Date of Patent: Feb. 13, 1990

[54] ECHOGRAPHIC TECHNIQUE-BASED METHOD AND APPARATUS TO DETECT STRUCTURE AND ANOMALIES OF THE SUBSOIL AND/OR SEA BOTTOM AND THE LIKE

[75] Inventors: Canneli G. Bosco; D'ottavi Enrico, both of Rome, Italy

[73] Assignee: Consiglio Nazionale Delle Ricerche, Rome, Italy

[21] Appl. No.: 278,089

[22] Filed: Nov. 30, 1988

[30] Foreign Application Priority Data

Dec. 11, 1987 [IT] Italy ................ 58694 A/87

[51] Int. Cl.$^4$ .................. G01V 1/16; H04R 17/00
[52] U.S. Cl. .................. 181/122; 181/108; 367/166; 367/180
[58] Field of Search ............. 181/108, 113, 122, 401, 181/402; 367/145, 147, 157, 159, 166, 171, 180, 188, 163, 173

[56] References Cited

U.S. PATENT DOCUMENTS

| | | | |
|---|---|---|---|
| 2,576,155 | 11/1951 | Trent | 367/157 |
| 3,572,462 | 3/1971 | Gray | 181/108 |
| 4,734,894 | 3/1988 | Cannelli et al. | 367/147 |

FOREIGN PATENT DOCUMENTS 0000039 5/1986 PCT Int'l Appl. .

Primary Examiner—Brian S. Steinberger
Attorney, Agent, or Firm—Townsend and Townsend

[57] ABSTRACT

An echographic technique based method for prospecting of the subsoil or sea bottom and the like, by means of acoustic waves and carried out by the use of an apparatus constitued, in combination of a known acoustic wave transmitting equipment (1) comprising of a body (6, 8) in the inside of which a chamber (9) is formed defined by an internal reflecting surface (7) shaped like a round paraboloid of axis (Y—Y), closed at the base by an elastic diaphragm (5) and filled with a proper liquid, into which acoustic waves are emitted produced by a pair of main electrodes (10a, 10b) associated with an auxiliary discharge priming electrode (11) put between the first ones. The equipment (1) will be installed at a predetermined distance "D" from a receiving equipment (2) having a body structure (6a, 8) substantially like to that of the equipment (2), but that near the focus of it internal parabolodic reflecting surface (7) has a ceramic piezoelectric detector (13) mounted on the lower end of a hollow rod supported by the head (6a) of said body, by means allowing said detector (13) to be moved into the chamber (9) with respect to the focus within a range of predetermined value in any direction.

9 Claims, 5 Drawing Sheets

ECHOGRAPHIC TECHNIQUE-BASED METHOD AND APPARATUS TO DETECT STRUCTURE AND ANOMALIES OF THE SUBSOIL AND/OR SEA BOTTOM AND THE LIKE

The present invention relates to an echographic technique based method for producing acoustic waves for prospecting the subsoil and/or sea bottom and the like, as well as to an improved apparatus for carrying out said method and that comprises, in combination, an equipment, "per se" already known, for the emission of a beam of acoustic waves for said prospecting process, and a non conventional equipment for reception of the reflected acoustic waves.

It is known that many different techniques are used to detect the internal structure of bodies and one of the most diffused techniques is that based upon the use of acoustic waves. This technique is frequently used in the field of the apparatus of medical diagnosis of internal organs and for geophysical applications, such as the prospecting of the subsoil, where acoustic waves have been used for hydrocarbon prospecting.

The use of said techniques is considered quite unsuitable, if it is applied in order to detect the structure of the subsoil or of the sea bottom or the like at shallow depths. In fact, as far as the prospecting of the first layers of the subsoil is concerned, two main difficulties are met. The first difficulty concerns the acoustic wave source that is traditionally employed, i.e. the difficulty of transmitting acoustic waves, into the ground, according to suitably high frequencies.

The second difficulty is, on the contrary, caused by the inadequacy of the commonly known receiving equipments in detecting P-waves reflected from small shallow anomalies of the subsoil.

As far as the traditional acoustic wave sources are concerned, it is known that these latter are characterized by having a very poor resolution power due not only to the fact that the ground selectively absorbs the acoustic waves, since it attenuates much more, the harmonic components towards the high frequency, but also due to their intrinsic limits in generating high frequency acoustic waves. In fact, the out off limit of the acoustic frequency band of this type of equipment is low, generally within the range of 150-260 Hz, but the most part of said sources works at frequency values much lower than the aforementioned limit (see: Ari Ben-Menaben and Sarva Yit Singh: "Seismic Waves and Sources" Springer, New York 1981). Such frequency values are unusable in a superficial prospecting that requires a high-resolution in order to detect small underground inhomogeneities. In fact, to distinguish these anomalies, the wave length of the acoustic waves must be small with respect to the dimensions of the anomalies to be detected. When considering the receiving system it has been proved that the systems based on the use of geophones are not apt for obtaining acoustic images useful for shallow prospectings of the subsoil. In fact the superficial waves, inevitably always present and amplified by geophones, mask the "useful" signals constituted of longitudinal waves (P-waves) reflected from the underground anomalies (see: M. B. Dobrin "Introduction to Geophysical Prospecting", Mc Graw-Hill, New York 1960).

The echographic technique proposed in the present invention shows that the underground small anomalies can be detected only by an echographic and properly adjusted system having good characteristics of directivity and using advantageously high frequencies.

The apparatus, which is the object of the present invention, can be advantageously applied in the industry and in a wide range of application fields of said improved prospecting system. More in particular, it can be usefully exploited in archeological explorations, where the known techniques based on acoustic prospecting have not yet met with success.

Furthermore, this system can be advantageously applied for location of water beds, for prospecting waters within the subsoil, and for studying the characteristics and behaviours of soils in areas planned for infrastructural works, such as foundations, tunnels, dams, thermonuclear plants and the like. This method and apparatus, which are object of the invention, can be also usefully employed in underwater prospecting, such as of seas, lakes or, of any natural sheet of water, of course, duly protecting the electric components, of which the apparatus are equipped, by suitable insulating means.

The echographic prospecting method of the present invention is based on a particular combination of two methods, the first of which concerns the transmission of acoustic waves, while the second one concerns the reception of reflected acoustic waves.

Identically, the improved apparatus of this invention provides the use, in combination, of two equipments or instruments, respectively designed to the carrying out of the one and the other of said methods.

More in particular, the apparatus, which is the object of this invention, is based on the combination of an equipment apt to produce and transmit special acoustic waves, this equipment being "per se" already known, since it is the object of a PCT Patent Application No. IT85/00039 of 1985 of the same inventors and of a U.S. Pat. No. 4,734,894 having the title: "Electroacoustic pulse-source for high resolution seismic prospecting". This first equipment is used, according to the present invention, in combination, with a novel equipment for receiving reflected acoustic waves, said two equipments being designed to operate together one with another, according to particular operative conditions and respectively with special mutual dispositions, so as to be able to give an optimal result.

The first known aforementioned method is carried out by means of an equipment comprising a source of acoustic or seismic waves and that acts within a metal hollow structure which defines in its inside a cavity in the form of a portion of surface shaped as a round paraboloid having the axis X—X, said portion including the head of said paraboloid, said cavity being limited by a base, placed in a plane perpendicular to the axis X—X and positioned underneath the focus of said paraboloidic surface. This cavity is closed at the base by means of an elastic diaphragm and is filled with a proper electrically insulating liquid, such as vaseline oil. Near the focus of the paraboloidical surface two main electrodes are set and an auxiliary electrode is put between the first ones, said electrodes being connected to a set of condensers supplied by a generator of high voltage power supply. Other details of this first already known equipment will be mentioned thereinafter, but they can be learnt in the specification of the aforementioned PCT Patent.

Said first equipment, "per se" known, must be employed according to a particular geometrical correlation with the equipment for receiving and detecting reflected acoustic waves which is an object of the present invention. Said method and equipment for carrying out the echographic receiving system are based upon the use of a metallic hollow body, that defines in its inside a cavity or chamber having the form of a round paraboloid, substantially similar to that of the first equipment for the transmission of acoustic waves. Therefore said chamber is closed at its base, by an elastic diaphragm and is filled with an electrically insulating liquid. Said second equipment has to be positioned at a suitable distance from the first one. Into the internal chamber of said second equipment is mounted, near the paraboloid focus, a device for picking up the reflected acoustic waves; said device consists of a piezoelectric-ceramic detector suitable to detect reflected acoustic waves and that is connected to an electronic circuit which is, at its turn, connected to an oscilloscope or other measuring instrument. Said piezoelectric detector is carried by a special support device which permits to move said detector either along the axis of the paraboloidical cavity, or to cause said receiving detector to move to and from said axis, in any direction so as to place said detector in the most convenient position for the best reception of the reflected acoustic waves.

These and other characteristics and advantages of the improved method and apparatus for applying said method, which are objects of the present invention will be better understood from the following description, reference being made to the accompaying drawings, in which.

Figure 6:
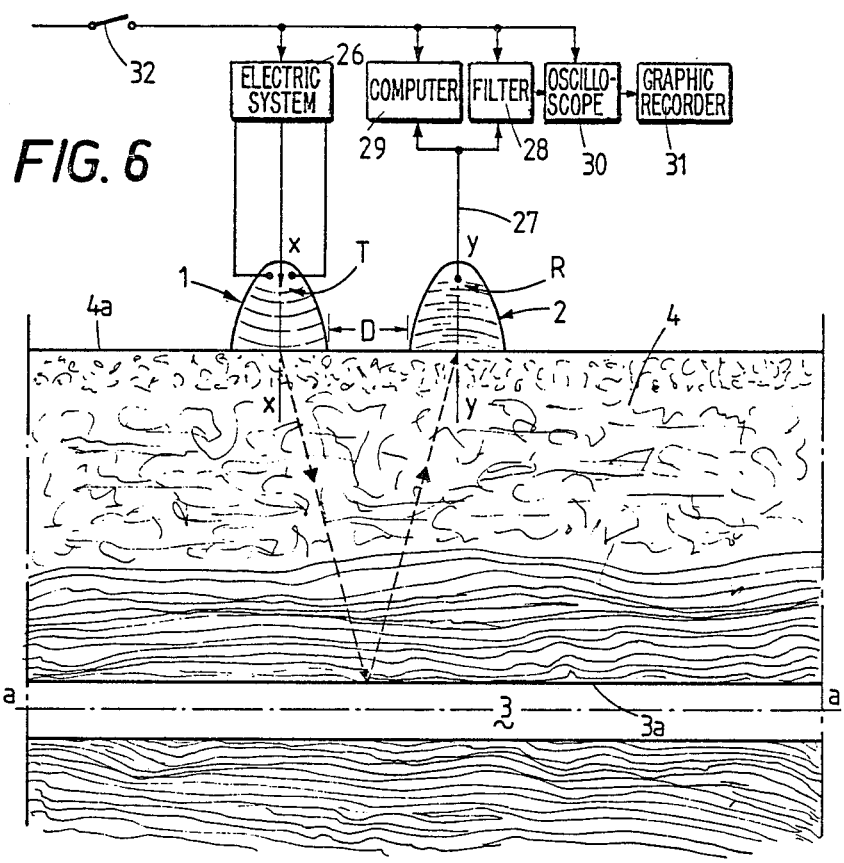
FIG. 6 shows a schematic diagram of the operative system of the improved apparatus of the present invention, for detecting an underground passage or tunnel in the subsoil, by means of an axial diagrammatic vertical section of the two co-operating equipments when installed in their operative position with regard to the cavity or tunnel to be detected.
Figure 8:
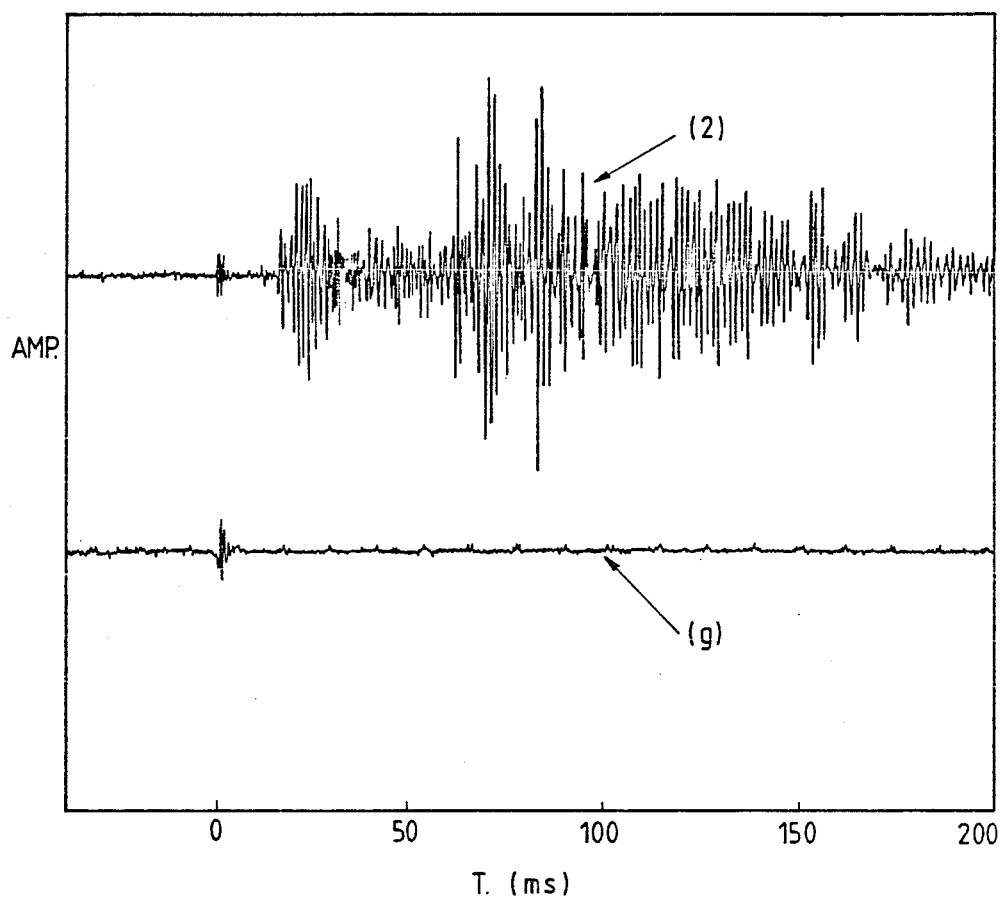
Figure 9A:
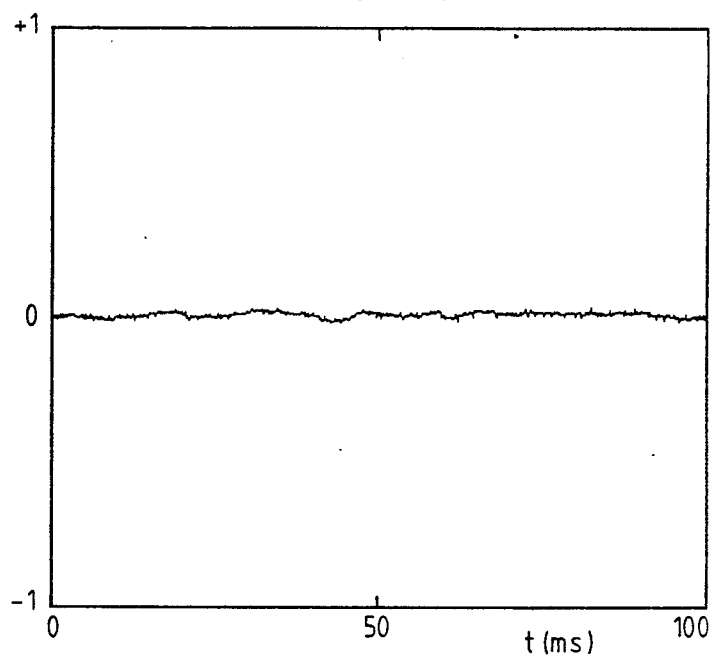
Figure 9B:
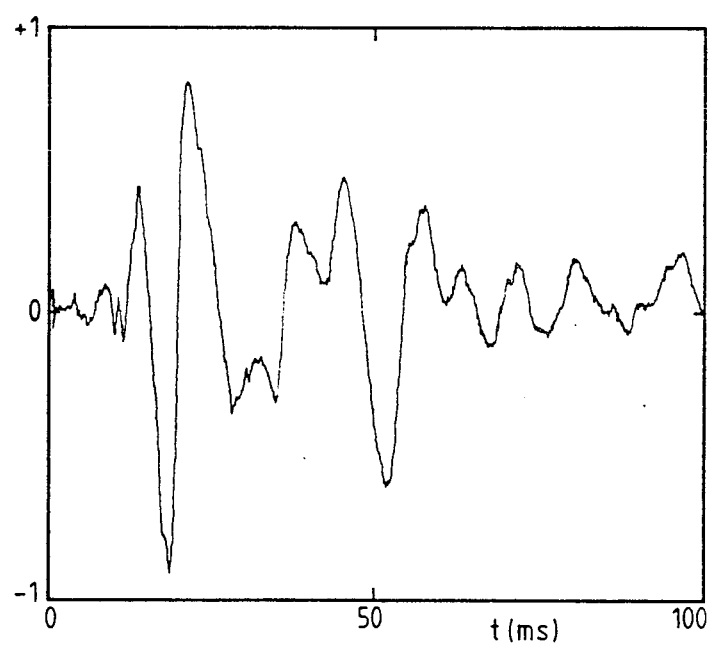

FIG. 8 shows a diagram in which the wave amplitude of the response of the equipment of this invention are compared with that obtained by a receiving equipment using geophones, in presence in the subsoil of the cavity, as shown in FIG. 6; and FIGS. 9A and 9B show, for comparison purpose, the signal detecting diagrams of the reflected acoustic waves, which are obtained in the same operative conditions, when conventional receiving means are used, and when the improved apparatus of the present invention is used.

Figure 1:
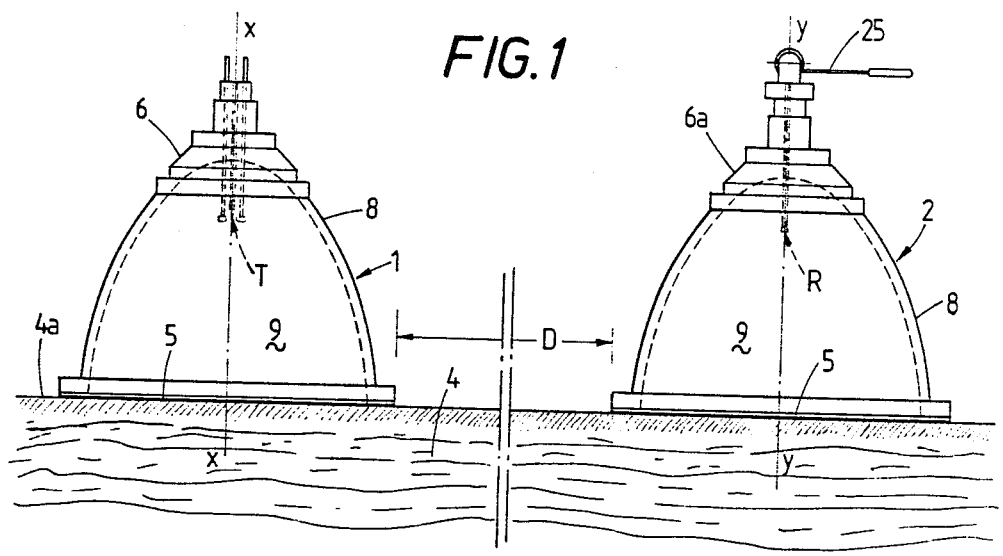
FIG. 1 is a diagrammatic view, as a whole, of the installation of the two equipments constituting the apparatus, in their operative positions, said view being taken from a plane parallel to the axes X—X and Y—Y, parallel to each other, of said two equipments.

Now referring to FIGS. 1 and 6 the improved apparatus of the invention is represented, consisting, in combination, of a transmitting equipment, generally marked 1, and already known, and of a receiving or detecting equipment generally marked 2 and which is an object of the present invention; said equipments can be, for instance, installed anywhere, at a predetermined distance D, from each other, that depends upon the configuration and depth of the cavity 3 to be detected in the subsoil 4.

Figure 2:
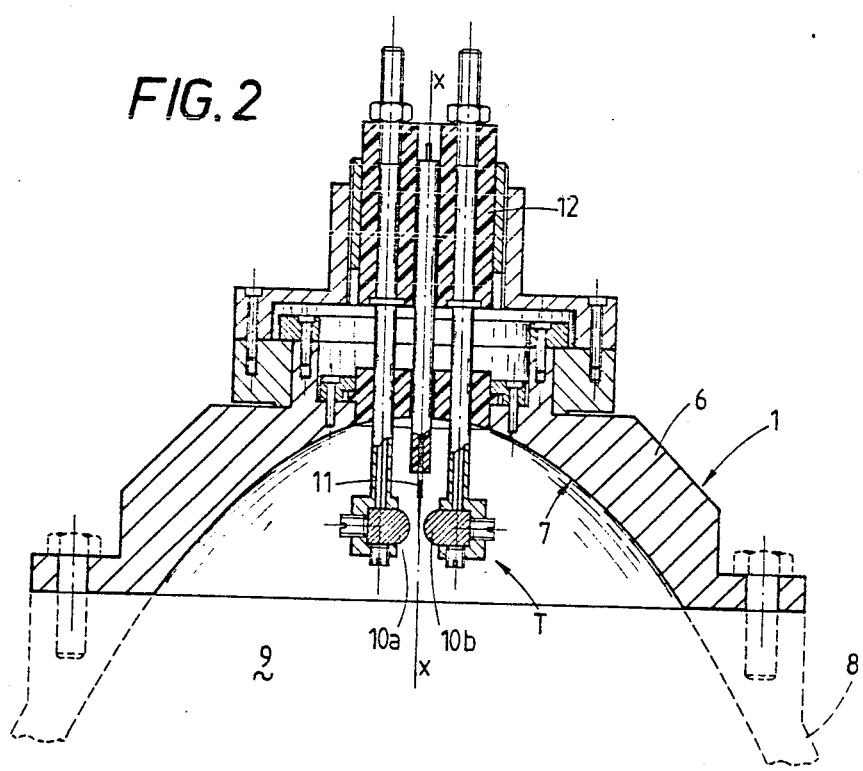
FIG. 2 shows a sectional view of the detail of the head portion of the first equipment, that is the object of the aforementioned PCT Patent, said Figure being given merely for the purpose of permitting an easier understanding of the method and improved apparatus which are object of the present invention.
Figure 3:
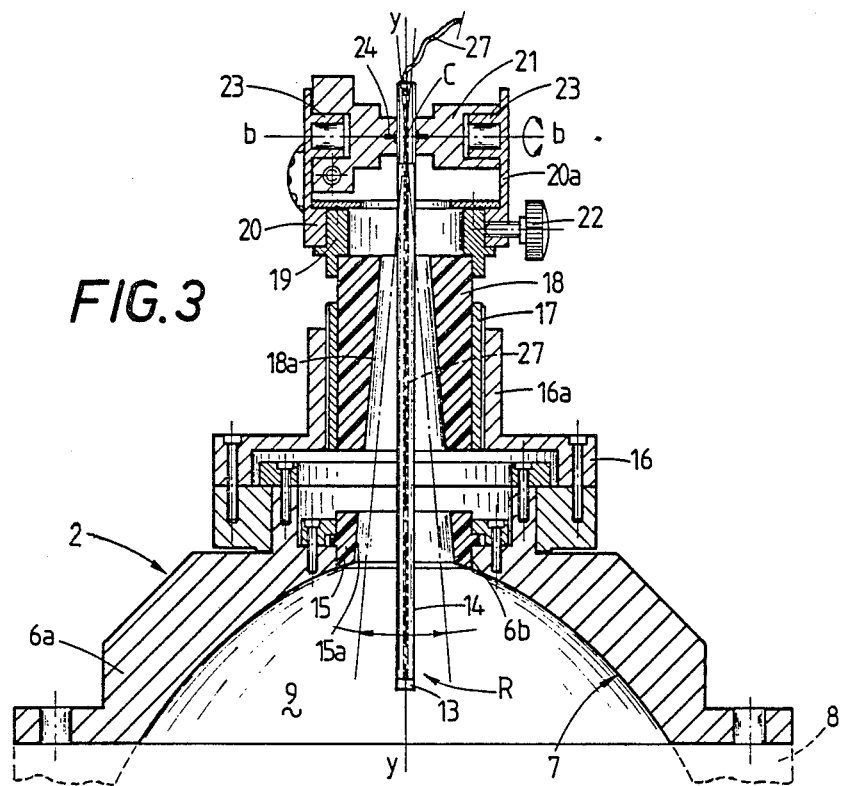
FIG. 3 is the axial sectional view, in an enlarged scale, of the detail of the head portion of the second equipment.
Figure 5:
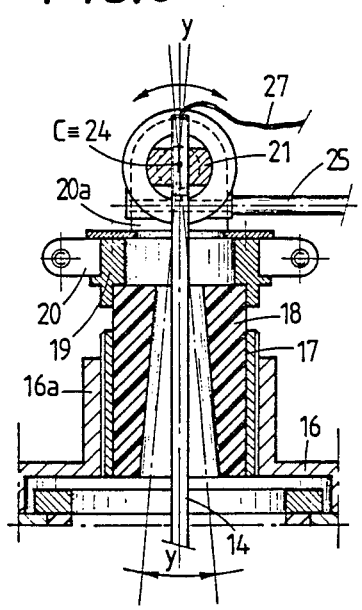
FIG. 5 shows a detail of the axial section Z—Z of FIG. 4 of the support and articulation device of the piezoelectric detector.
Figure 4:
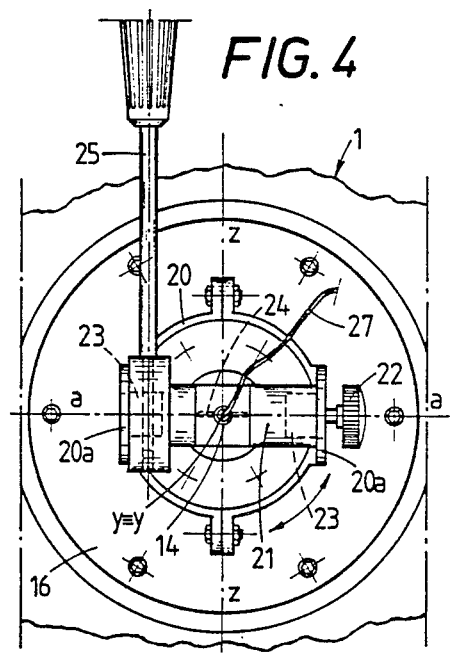
FIG. 4 is the top view showing the detail of the supporting and articulation device permitting the adjustment of the position of the piezoelectric detector for detecting the reflected acoustic waves and shown in FIG. 3.

The equipment 1 produces acoustic waves by means of a device T, diagrammatically represented in FIG. 1, and that although it is the object of the aforementioned patent PCT, will be illustrated in detail thereinafter with reference to FIG. 2, for the purpose of allowing an easier and better understanding of the improved method of the present invention and of the characteristics of the apparatus, which consists, as has been already said, in the combination of a known equipment 1 and of an equipment 2, which is object of the present invention and which must operate in particular conditions of mutual positioning. In FIGS. 1 and 6 the detecting device for the reflected acoustic waves is shown diagrammatically and is generally indicated R.

The two equipments 1 and 2 comprise a similar metal structure, made, as for instance, of an aluminium alloy; each of those equipments is constituted of a hollow or empty body 8 connected to a upper head 6, or respectively 6a, each connected to the body 8 in a disassemblable manner and which, in combination, define in the structure 2 a cavity or chamber 9, the internal surface of which has the shape of a round paraboloid having a rotation axis X—X. As already provided in the prior cited patent, each cavity or chamber 9 has a shape that is symmetric with regard to the axis X—X or Y—Y of each paraboloidic surface 7 which defines said cavity, that is open in the lower part along a base plane perpendicular to the respective axis, where it is closed by an elastic diaphragm 5, in neoprene, for instance. Said cavity 9 is filled with an electrically insulating liquid of high electric resistivity and having a low dielectric rigidity. The first equipment or electroacoustic transducer T is mounted within the structural body 1, 6 and comprises the following components: two main electrodes 10a, 10b and auxiliary electrode 11 put between the preceding ones and positioned on the axis X—X of the surface 7 that is so treated as to become specular and which has the shape of a round paraboloid; the electrodes 10a, 10b and 11 are carried by the head 6 and are connected to a driving high voltage generator through a set of condensers. One of the main electrodes 10a, 10b and the electrode 11 are connected to a synchronism electric pulse generator by means of a remote control. This assembly has not been represented in detail, but only indicated generically by the block 26 of FIG. 6.

The electrodes 10a, 10b and 11 are supported by a cylindrical support body 12 externally threaded and inserted into a counterthreaded cylindrical housing mounted in the head 6 said sleeve being coaxial to the axis X—X, so that by screwing less or more the support body 12 into its housing sleeve, contemporaneous vertical displacements of the electrodes 10a, 10b and 11 can be obtained parallel to the axis X—X.

The electrodes 10a and 10b are mounted on the respective lower ends of their supporting rods with the interposition of adjusting means which permit to move said electrodes horizontally to and from the axis X—X, while on the contrary, the electrode 11 remains always on the axis X—X. The discharge between the main electrodes 10a, 10b, primed by a preliminary spark produced by the electrode 11, generates an acoustic pulse that is transmitted-through the liquid medium filling the chamber of cavity 9 defined by the surface 7 and the diaphragm 5, to the soil, against the surface 4a of which, the electroacoustic transducer 1 is engaged with force, or within the water in the event of an underwater prospecting.

As stated in the cited PCT Patent, a very important characteristic of this kind of acoustic waves source consists in the fact that it allows to influence, within certain limits, the frequency spectrum of the produced acoustic pulses by acting on the electric parameters of the electroacoustic transducer.

Another possibility consists in the fact that it becomes now possible to modify the wave front coming from the source and that enables, as given ratio between the base diameter and the wave length is employed to well focalize the beam of the emitted acoustic waves. In such a way the acoustic radiation beam can be let converge or diverge, according to the prospecting requirements.

Such a peculiarity of the source for transmitting acoustic waves depending upon the particular configuration of the round paraboloidic internal reflecting surface 7 has an optimal utilization, when it is associated with a receiving transducer 2 comprising a paraboloidic surface 7 identical to that of the transmitting surface and arranged in the inside of the metal body 2, 6a. Therefore, in the equipment 2 (FIGS. 1 to 6) identical components are indicated with the same reference numbers, the head of the body 2 excepted, that is indicated 6a, since it is modified, due to the different intended purpose of the equipment 2. In this equipment 2, the head 6a supports a ceramic piezoelectric detector 13 provided to detect the direct waves reflected by the surface 7, and which is supported by a tubular rod 14 and positioned at a suitable distance from the focus of the internal reflecting surface 7 which defines together with the diaphragm 5 the chamber 9 and which has the form of a round paraboloid about the axis Y—Y (FIGS. 3 to 6).

The detector 13 mounted at the lower end of the rod 14 immersed into the liquid, with which said internal chamber 9 is filled and that is closed at its lower end by a diaphragm 5, the whole in identical manner as provided in the transmitting equipment 1. In the upper end of the head 6a an axial hole 6b is arranged, into which a guiding collar 15 is mounted made of an electrically insulating material and that is coaxial with the axis Y—Y, said collar having, in its turn, an axial hole 15a having an axis coincident with the axis Y—Y and having a surface shaped as a frustum of right circular cone having an angular aperture substantially equal to the maximum angle of inclination that the support rod 14 can take when it is caused to rotate about the center point C which will be thereafter defined on the axis Y—Y. Upon the head 6a a shaped pipe union body 16 is mounted, coaxial with axis Y—Y and internally threaded at its upper narrower portion 16a to receive a cylindrical sleeve 17 externally threaded and designed to be screwed less or more deeply into the portion 16a of said pipe union body 16. In the tubular sleeve 17 is partially inserted and securely fixed a cylindrical coaxial hollow body 18 made of electrically insulating material and having an axial hole 18a in the form of a frustum of a right circular cone of an aperture angle substantially equal to that of the maximal inclination angle that the rod 14 will be able to take with regard to the axis Y—Y. Around the upper portion of the sleeve 18 is securely fixed a metal ring or collar 19 provided to support a double pin joint device 20, 21. The lower part 20 of said joint device consists of a tubular member so dimensioned as to be able to rotate, together to what is supported by it, about the collar 19 and that can be locked to this latter in any mutual chosen position, by means of a set screw 22, means being also provided to prevent any axial displacement of it along the collar 19. The joint device 20 extends upwards with two diametrally opposite lugs 20a, from the internal facing surfaces of which extend, one towards the other, two coaxial hollow pins 23, about the axis b—b of which a shaped round member 21 is mounted having circular cross sections, perpendicular to said axis b—b. Said shaped member 21, that constitutes the second joint element, supports the rod 14 by means of coaxial pins 24, said element containing the articulation center C.

The result, is that the piezoelectric detector 13 can be caused to move parallel to the axis Y—Y, by causing the pipe union body to rotate around the hollow sleeve 17, together with the internal sleeve 18 and the double pin joint device 20, 21, so as to vary of a required value the height of the detector 13, owing to the screw connection between the elements 16, 16a and 17. The double pin joint device 20, 21, on the contrary, allows to move angularly the piezoelectric detector 13 towards any direction within a range of a predetermined radius, around the focus of the paraboloidic surface 7, causing the shaped shaft 21 to rotate about the axis b—b of an angle not greater than a predetermined one, by means of a force applied on a control arm 25, skewed with regard to the axis b—b and forming an angle of 90° with this latter; this rotary movement takes place in presence of friction means so that the joint element 21, together with the cylindrical rod 14 carried by it, can then remain in its attained position. Then, the angular movement of the detector 13 with regard to the axis Y—Y is performed, first of all releasing the locking screw 22, and then causing the whole assembly 20 to rotate together with the rod 14, so as to move the detector 13 until the optimal angular position within the predetermined adjustment range. Of course the two manoeuvres could be carried out also according to inverted sequence.

By summarizing, the combination of said two rotary movements, with regard to the position of the axes Y—Y and b—b, allow to sound the space around the focus substantially along spherical dome-shaped theoretical surfaces having the center C. The use of said mechanical adjusting device, which permits the displacement of the detector 13, is necessary due to the fact that the position in which an optical focusing of the acoustic beam in the receiving phase, is obtained, is variable, since it depends upon the particular structure of the subsoil 4 being explored, and does not coincide necessarily with the focus of the paraboloidic surface 7 of the equipment, although it can be very close to said theoretical focus. Some results are now given, which have been obtained in prospecting some kinds of underground cavities. A schematic diagram of the operative principle of the complete echographic system applied in the improved apparatus of the present invention is shown in FIG. 6. The acoustic pulse, generated by the transmitting device T and produced by reflection of the acoustic waves on the reflecting surface 7, travels in the subsoil 4 until it reaches the ground-cavity interface 3a of the cavity 3, from which it is reflected and sent back to the earth surface 4a, where the receiving equipment 2 is placed and which focalizes the received acoustic waves towards the piezoelectric detector 13. Said electric system which controls the pulse transmission is well known from the cited PCT patent and, as has been already mentioned, is indicated by the block 26 in FIG. 6.

Figure 7:
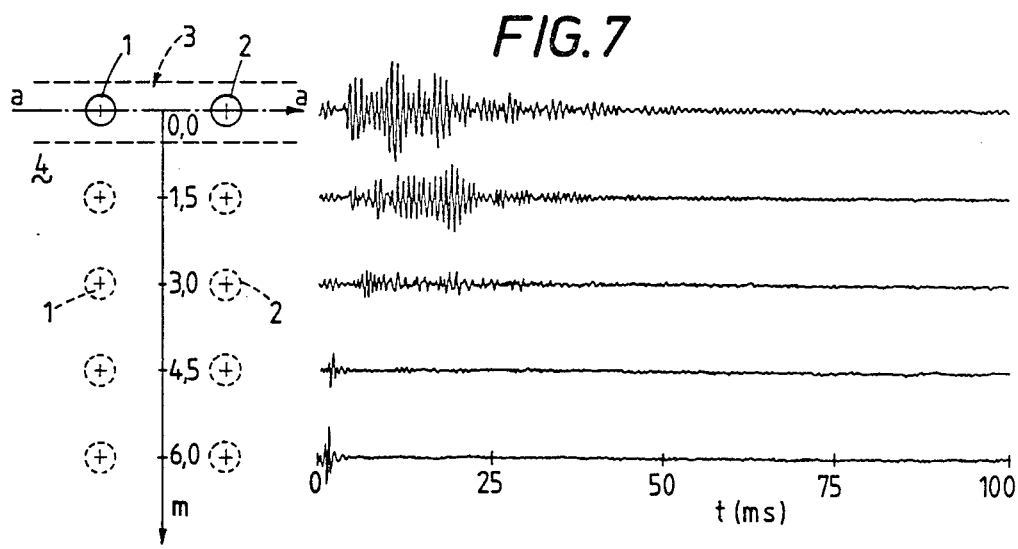
FIG. 7 shows a picture of the shape and amplitude of the reflected acoustic waves in the subsoil at different scanning distances from the vertical plane passing for the axis a—a of the cavity to be detected, in function of the time (in ms) and which has been obtained by displacing the apparatus parallel to said vertical plane passing for the axis a—a of said cavity to be detected.

Now referring to the receiving system, the piezoelectric detector 13 can detect signals in a very broad frequency range (from 0.1 Hz to 125 kHz) with an accuracy of 2 dB. By means of a cable 27 the reflected signal is sent to a filter 28 and to a computer 29 for the preliminary processings in the field. The filter 28 sends a signal to a control storage oscilloscope 30, that, in its turn produces a graphic reproduction with regard to two orthogonal axes, by means of a paper graphical recorder 31. In FIG. 6, 32 indicates the start switch. It is to be pointed out that the capability of using acoustic waves of frequencies higher than those of the traditional acoustic wave sources of the known apparatus allows to obtain the high resolution which is especially necessary in shallow prospectings. In particular, the use of frequency band from 1000 to 2000 Hz allows to detect the presence of shallow cavities of the subsoil, as it is well shown in the picture of FIG. 7.

The prospecting was carried out on a subsoil 4 through which there is a passage or tunnel 3 at a depth of some meters (between 3 and 5 m) in an archaeological area of Rome (Italy), the presence of which had been localized in advance. The scanning begins starting from the position of the point 0.0, where a vertical intersects axis a—a of the underground passage or tunnel 3, installing the equipments 1 and 2 of the apparatus with their axes X—X and Y—Y respectively both in the vertical plane passing along said axis, and thus a—a. The picture shows clearly there is found a maximum of amplitude of the acoustic signal in the time t (ms), when the apparatus is installed in this initial position, and descrasing amplitudes, when the apparatus is successively moved more and more away from said vertical plane, when said apparatus is displaced along the horizontal axis, passing in the point 0.0 and which is perpendicular to the axis a—a of the tunnel 3.

At a distance of 4.5 m from said vertical plane, passing along the axis a—a, the acoustic signal is already quite absent.

In FIG. 8 is shown a diagram in which the response obtained with the use of the equipment 2 of the present invention is compared with that obtained with the use of a receiving equipment using a set of geophones, in the same experimental conditions employed to detect the cavity 3 according to system illustrated in FIG. 6. It is to be noted also that the receiving equipment 2, carried out according to the present invention, has been also compared with the already known acoustic wave receiving equipment having similar geometrical configuration which is the object of the U.S. Pat. No. 3,895,188 of July 15, 1985, entitled "Sound Collecting Device". This U.S. patent provides the use of a structural hollow body having an internal cavity in the form of a round paraboloid, but this cavity contains only air, so that it is able only to detect, by means of a microphone, the sound waves present in the air. Said internal cavity of the equipment of the cited U.S. patent is closed at the base by a diaphragm of a type apt only to prevent entrance of wind squalls and/or of foreign materials into said cavity in wind or bad weather conditions.

The receiving equipment of the present invention, on the contrary, has been provided for geoacoustic applications and otherwise of the aforementioned U.S. patent, it comprises an internal cavity or chamber filled with liquid and it uses a piezoelectric detector 13 having near the focus an adjustable position, in any direction within predetermined action range in order to allow to find the optimal focusing point of the acoustic waves which are reflected from the subsoil.

A reception test has been also carried out, using an apparatus comprising receiving equipment constructed according to the teachings of said U.S. Pat. No. 3,895,188 (see FIG. 9A), and a test in which is used an apparatus comprising the receiving equipment of the present invention (see FIG. 9B), each of said receiving equipments being used, in combination, with transmitting equipment which is the object of the cited PCT patent No. IT85/00039. The type of the reception signal, as shown in FIG. 9A, is that obtained with the receiving equipment of the aforementioned U.S. patent, and which comprises a microphone that can be moved only along the axis of the paraboloidic surface, into the internal cavity of which air is contained.

Said signal, very probably, due to the sole presence of aerial signal, has a very limited amplitude, remarkably less than that could be obtained by reflection of a pulse on the underground cavity or tunnel, that, on the contrary, is not practically detected, while the signal obtained when the receiving equipment 2 is used, in which a liquid is contained in the internal chamber of this latter according to the present invention (FIG. 9B) by the use of which it is possible to localize the optimal focusing point of the acoustic wave due to the signal reflected from the subsoil cavity, has a considerable greater amplitude, so that it is proved that the cited U.S. patent, even if it consists of an equipment, apparently similar, cannot substitute the equipment 2 of the present invention.

We claim:

1. A receiver for receiving reflected acoustic waves, comprising:
   a metal body defining an inner hollow chamber and an open base, said hollow chamber having a round paraboloidal reflective surface with an associated axis and a focus;
   an elastic diaphragm, mounted on said metal body, for closing said open base;
   an electrically insulating liquid in said hollow chamber;
   a single ceramic piezoelectric detector mounted within said hollow chamber; and
   a head, mounted on said metal body, for adjusting said piezoelectric detector to a plurality of positions including said focus of said reflective surface and at least one position spaced from said focus to focalize the reflected acoustic waves on said piezoelectric detector.

2. The receiver of claim 1 wherein said head includes:
   first means for moving said piezoelectric detector parallel to said associated axis;

second means for moving said piezoelectric detector away from said associated axis; and third means for rotating said piezoelectric detector about said associated axis said first, second and third means for locating an optimal position for reception of the reflected acoustic waves.

3. A receiver of claim 1 further including means for analyzing output from said piezoelectric detector, selected from the group consisting of a computer, electrically coupled to said piezoelectric detector, a filter, electrically coupled to said piezoelectric detector, an oscilloscope for displaying a graphic representation of the reflected acoustic waves, and a recorder for producing said graphic representation of the reflected acoustic waves on paper.

4. The receiver of claim 1 wherein said head, having a central hole coaxial with said associated axis, includes:

a support having an upper portion and a lower portion, mounted within said central hole of said head and extending downwardly into said hollow chamber, for supporting said piezoelectric detector with said lower portion;

an electrically insulating collar coaxial with said associated axis in the shape of a frustum of a right circular cone mounted within said central hole of said head, said collar having a central hole sized to permit said support with said piezoelectric detector to make angular and rotational movements therein with respect to said associated axis;

a connector coaxial with said associated axis, mounted on said head, for moving said support with said piezoelectric detector parallel to said associated axis to locate an optimal position for reception of the reflected acoustic waves on the path to be travelled, said connector having an upper portion and a lower portion with a diameter wider than that of said upper portion, said upper portion of said connector being an internally threaded tubular sleeve portion;

an externally counter-threaded metal sleeve, mounted within said sleeve portion of said connector;

an electrically insulating cylindrical body coaxial with said associated axis in the shape of a frustum of a right circular cone mounted within said metal sleeve, said cylindrical body having a central hole sized to permit said support with said piezoelectric detector to make angular and rotational movements therein with respect to said associated axis;

a double pin joint device supporting said upper portion of said support, mounted on said head, for allowing said support with said piezoelectric detector to make angular and rotational movements with respect to said associated axis; and a metal collar, mounted on said head, for supporting said double pin joint device.

5. The receiver of claim 4 wherein said double pin joint device includes:

a ring, rotatably mounted about said metal collar, having a pair of diametrically located lugs extending upwardly, each of said pair of lugs including an internal hollow pin with a coaxis perpendicular to said associated axis;

a releasable set screw for locking said ring and said metal collar together in a mutually selected position, said set screw, when released, permitting said ring and said support with said piezoelectric detector to rotate about said associated axis to locate an optimal position for reception of the reflected acoustic waves on the path to be travelled; and a body, supported by said hollow pins of said ring, including a central pin coaxial with said coaxis for supporting said support and a control arm perpendicular to said coaxis but skew with respect to said associated axis for rotating said body about said coaxis to a particular position and keeping said body therein, wherein said support with said piezoelectric detector is moved away from said associated axis to locate an optimal position for reception of the reflected acoustic waves on the path travelled.

6. An echographic system comprising:

a transmitter for emitting acoustic waves for high-resolution seismic prospecting; and a receiver, located at a predetermined distance away from said transmitter, for receiving reflected acoustic waves emitted by said transmitter, including:

a metal body defining an inner hollow chamber and an open base, said hollow chamber having a round paraboloidal reflective surface with an associated axis and a focus, an elastic diaphragm, mounted on said metal body, for closing said open base, an electrically insulating liquid in said hollow chamber, a single ceramic piezoelectric detector mounted within said hollow chamber, and a head, mounted on said metal body, for adjusting said piezoelectric detector to a plurality of positions including said focus of said reflective surface and at least one position spaced from said focus to focalize the reflected acoustic waves on said piezoelectric detector.

7. The echographic system of claim 6 wherein said head of said receiver includes:

first means for moving said piezoelectric detector parallel to said associated axis;

second means for moving said piezoelectric detector away from said associated axis; and third means for rotating said piezoelectric detector about said associated axis said first, second and third means for locating an optimal position for reception of the reflected acoustic waves.

8. An echographic method for prospecting the earth including subsoil and sea bottom, comprising the steps of:

providing an acoustic transmitter;

providing a receiver at a predetermined distance away from said acoustic transmitter, said receiver having a metal body defining an inner hollow chamber and an open base, said hollow chamber having a round paraboloidal reflective surface with an associated axis and a focus;

closing said open base with an elastic diaphragm;

filling said hollow chamber with an electrically insulating liquid;

mounting a single ceramic piezoelectric detector within said hollow chamber;

mounting a head on said metal body; and using said head to adjust said piezoelectric detector to a plurality of positions including said focus of said reflective surface and at least one position spaced from said focus to focalize the reflected acoustic waves on said piezoelectric detector.

9. The echographic method of claim 8 further including the steps of:

moving said piezoelectric detector parallel to said associated axis;
moving said piezoelectric detector away from said associated axis; and,
rotating said piezoelectric detector about said associated axis to locate an optimal position for reception of the reflected acoustic waves on the path to be travelled.

* * * * *

UNITED STATES PATENT AND TRADEMARK OFFICE
CERTIFICATE OF CORRECTION

PATENT NO. : 4,899,845

DATED : Feb. 13, 1990

INVENTOR(S) : Giovanni B. Cannelli, et al

It is certified that error appears in the above-identified patent and that said Letters Patent is hereby corrected as shown below:

Title page, item [19]:    the name of the inventor is wrongly indicated; delete "Bosco" and substitute --Cannelli--.

In the inventor designation, Sheet 1, Column 1, Line 75, the names of the inventors are wrongly indicated; delete "Canneli G. Bosco" and substitute --Giovanni B. Cannelli--; and delete "D'ottavi Enrico" and substitute --Enrico D'Ottavi--.

Signed and Sealed this

Twentieth Day of August, 1991

Attest:

HARRY F. MANBECK, JR.

*Attesting Officer*    Commissioner of Patents and Trademarks